(12) United States Patent
Hatono

(10) Patent No.: US 7,675,455 B2
(45) Date of Patent: Mar. 9, 2010

(54) PULSE RADAR, CAR RADAR AND LANDING ASSISTANCE RADAR

(75) Inventor: Atsuo Hatono, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 66 days.

(21) Appl. No.: 11/961,036

(22) Filed: Dec. 20, 2007

(65) Prior Publication Data

US 2009/0051581 A1  Feb. 26, 2009

(30) Foreign Application Priority Data

Dec. 25, 2006  (JP)  ............................. 2006-347888

(51) Int. Cl.
*G01S 13/08* (2006.01)
*G01S 13/00* (2006.01)

(52) U.S. Cl. ............................. 342/33; 342/134; 342/70

(58) Field of Classification Search .................... 342/33, 342/70, 203

See application file for complete search history.

(56) References Cited

U.S. PATENT DOCUMENTS

| 4,103,300 | A | * | 7/1978 | Gendreu et al. | ............... 342/33 |
| 4,891,649 | A | * | 1/1990 | Labaar et al. | ............... 342/203 |
| 6,211,831 | B1 | * | 4/2001 | Nagy et al. | .................. 343/713 |
| 2009/0051581 | A1 | * | 2/2009 | Hatono | ........................ 342/33 |

FOREIGN PATENT DOCUMENTS

| JP | 05056009 | 3/1993 |
| JP | 2003279649 | 10/2003 |

OTHER PUBLICATIONS

"Wave summit course, New Millimeter Wave Technique" by Hiromoto et al., pp. 278-279, Nov. 25, 1999 and English translation of Table 9.7 of p. 278.

* cited by examiner

*Primary Examiner*—Dan Pihulic
(74) *Attorney, Agent, or Firm*—Darby & Darby P.C.

(57) ABSTRACT

A pulse radar is provided with a filter for eliminating a transmission waveform interfered with an answering signal from a received waveform, and a harmonic detector or a phase delay detector for detecting arrival and end of the answering signal reflected on a target.

8 Claims, 13 Drawing Sheets

PULSE RADAR, CAR RADAR AND LANDING
ASSISTANCE RADAR

CROSS-REFERENCE TO RELATED
APPLICATION

The disclosure of Japanese Patent Application No. 2006-347888 filed on Dec. 25, 2006 including the specification, drawings and abstract is incorporated herein by reference in its entirety.

BACKGROUND OF INVENTION

1. Field of the Invention

The present invention relates to a pulse radar based on the principle that a distance is computed from a time difference from when a pulse signal is reflected from a target until when the reflected pulse signal is received. Particularly, a pulse radar is mounted on an automobile and on an aircraft which flies horizontally at a very low altitude.

2. Description of the Related Art

The following three systems have hitherto been used for a radar and a radio sensor, as disclosed in "New Millimeter Wave Technique" pg. 278 (Tasuku TESHIROGI/Tsutomu YONEYAMA, Ohmsha Co., Nov. 25, 1999)

(1) Pulse Radar
(2) FM-CW Radar (Frequency Modulation Continuous Wave Radar
(3) Two-tone CW (Continuous Wave Radar)

In the "pulse radar" system (1), a signal which is shaped like a pulse from a high-frequency waveform is repetitively transmitted at a certain interval. The thus-transmitted pulse signal is scattered by a target. Then, the scattered wave is received as an answering wave. A time between end of transmission of the pulse signal and reception of the answering wave from the target becomes proportional to a distance from the target. Accordingly, in the "pulse radar" system, the distance to the target is measured on the basis of a period from the time transmission of the pulse signal is completed until the level of the answering wave from the target exceeds a threshold value. In the "FM-CW radar" system (2), a transmission signal is frequency-modulated at a given period and whose frequency is iteratively increased and decreased at a given ratio. The transmitted frequency-modulated signal is scattered by a target, and the scattered wave is received as an answering wave. The receiving end extracts a difference (hereinafter described as a "beat frequency") between the frequency of the transmission wave and the frequency of the received wave. The beat frequency becomes proportional to a distance from the target. As mentioned above, the "FM-CW radar" system measures a distance by detecting the beat frequency of the signals. Moreover, the two-tone CW system (3) is a system which transmits two waves (which cause a phase difference as a distance changes) slightly differing from each other in terms of a frequency, such as f1=24 GHz and f2=24 GHz+75 MHz. A distance is measured by detecting a phase difference between two waves arising within a roundtrip propagation time to the target.

Prior arts for reducing interference by the transmission pulse signal to the receiving signal have been proposed. JP-A-05-56009 discloses a transceiver which, when simultaneously performing transmission and receipt of a pulse signal, removes an impediment by interference of the transmitting end to the receiving end, without distortion of a received wave signal. Specifically, the transceiver has an adaptive filter and a subtractor as interference wave suppression means. The adaptive filter simulates a received interference wave signal by the transmitting ends to the receiving end, by inputting a part of a transmission signal additionally provided with a broadband signal of the transmitting end. The subtractor subtracts a signal output of the adaptive filter from a signal output of the receiver. JP-A-2003-279649 discloses hindering interference of a transmission wave by interposing a flat shielding plate between a transmission antenna and a receiving antenna.

A short-range radar demands short-range resolution rather than the maximum detectable range. For instance, a short-range radar for use with an automobile driving assist system is intended such as a parking assist, object detection in a blind spot, a pre-crash alarm, a sideways proximity alarm, and the like. Although a maximum detection range of about 3 m is allowed in many cases, a minimum distance resolution is desired less than 10 cm. However, when a short-range radar is implemented by the systems (1) through (3), any of the systems involves broadening of an occupied bandwidth with varying degrees. Broadening of the occupied bandwidth raises various problems, such as a necessity for a high frequency for a carrier wave, difficulty in designing of an antenna, and an increase in cost of a circuit, as well as a decrease in the number of channels which can be set in a single frequency band.

SUMMARY OF INVENTION

One or more embodiments of the invention provide a radar which has high short-range resolution in a narrow bandwidth.

According to a first aspect of the invention, a pulse radar is provided with a transmitting antenna, a receiving antenna, a filter on a circuit board for transceiving which filters an answering wave signal from a received signal in which a diffracted transmission pulse signal from the transmitting antenna to the receiving antenna is super imposed on the answering wave signal from a target, and a detector which detects a time difference between a rise time of the answering wave filtered by the filter and a rise time of the transmission pulse signal and a time difference between a fall time of the answering wave and a fall time of the transmission pulse signal.

According to a second aspect of the invention, a pulse radar is provided with a transmitting antenna, a receiving antenna, an adaptive filter on a circuit board for transceiving which performs adaptive filtering for filtering an answering wave signal from a received signal in which a diffractive transmission pulse signal from the transmitting antenna to the receiving antenna is superimposed on the answering wave signal from a target, by estimating a parameter of a linear filtering equivalent to antennas and a propagation space by a learning processing, generating a pseudo diffractive wave from the transmission pulse signal, and subtracting the thus-generated pseudo diffracted wave from the received signal, and a detector which detects a time difference between a rise time of the answering wave from each of targets and a rise time of the transmission pulse signal and a time difference between a fall time of the answering wave from the each of targets and a fall time of the transmission pulse signal, by extracting a harmonic which has a higher frequency than a frequency of a carrier wave and arises at a time of arrival of a new answering wave from a target.

According to a third aspect of the invention, a pulse radar is provided with a transmitting antenna, a receiving antenna, an adaptive filter on a circuit board for transceiving which performs adaptive filtering for filtering only an answering wave signal from a received signal in which a diffractive transmission pulse signal from the transmitting antenna to the receiving antenna is super imposed on the answering wave signal from a target, by estimating a parameter of a linear filtering equivalent to an antenna and a propagation space by learning processing, generating a pseudo diffractive wave from the transmission pulse signal, and subtracting the thus-generated pseudo diffracted wave from the received signal, and a detector for detecting a time difference between a rise time of the answering wave from each of targets and a rise time of the transmission pulse signal and a time difference between a fall time of the answering wave from the each of targets and a fall time of the transmission pulse signal, by extracting a phase delay in a carrier wave arising at the time of arrival of a new answering wave from the target.

According to a fourth aspect of the invention, a pulse radar in which a distance is computed from a time difference between the time a pulse signal is transmitted to a relatively moving target and the time the pulse signal reflected from the target is received, the pulse radar is provided with a measure on a circuit board for transceiving which measures a distance to a target located within one-half or less of a distance over which an electromagnetic wave propagates within a duration time of a transmission pulse. And the pulse radar may be provided with a detector on the circuit board which detects a time difference between a rise time of an answering wave embedded in a received signal in which a diffracted transmission pulse signal from a transmitting antenna to a receiving antenna is superimposed on the answering wave signal from a target and a rise time of the transmission pulse. In addition, the pulse radar may be provided with a setting device on the circuit board which renders an occupied bandwidth narrower than a value obtained by dividing light speed by a minimum measurable distance.

According to a fifth aspect of the invention, a vehicle-mounted radar is provided the pulse radar, a measure on the circuit board which measures a distance to a target located within one-half or less of a distance over which an electromagnetic wave propagates within a duration time of the transmission pulse, and a device which covers a wide-angle area by making a wavelength of a carrier wave the same degree in size as a width of a vehicle.

According to a sixth aspect of the invention a vehicle-mounted radar is provided with the pulse radar, a measure on the circuit board which measures a distance to a target located within one-half or less of a distance over which an electromagnetic wave propagates within a duration time of the transmission pulse, and a sharing device which shares a receiving processing circuit with a keyless entry system by making a frequency of a carrier wave equal to a frequency of the keyless entry system.

According to a seventh aspect of the invention, a landing assist radar is provided with the pulse radar, a measure on the circuit board which measures a low altitude at which a time elapsing from transmitting a transmission pulse until a reflected electromagnetic wave is received after the electromagnetic wave is reflected on a ground or a sea surface becomes shorter than a duration time of the transmission pulse of the landing assist radar.

According to a eighth aspect of the invention, a landing assist radar is provided with the pulse radar, a measure on the circuit board which measures a low altitude at which a time elapsing from transmitting a transmission pulse until a reflected electromagnetic wave is received after the electromagnetic wave is reflected on a ground or a sea surface becomes shorter than a duration time of the transmission pulse of the landing assist radar, and a device which covers a wide-angle area by making a wavelength of a carrier wave the same degree in size to a width of an air frame of an aircraft.

According to a ninth aspect of the invention, a landing assist radar is provided with the pulse radar, a measure on the circuit board which measures an altitude at which a time elapsing from transmitting a transmission pulse until a reflected electromagnetic wave is received after the electromagnetic wave is reflected on a ground or a sea surface becomes shorter than a duration time of the transmission pulse of the landing assist radar, and which measures an altitude even when a aircraft is on high-speed horizontal move by rendering a wavelength of the carrier wave longer than a horizontal distance over which the aircraft moves within a period of time from transmitting a transmission pulse until an electromagnetic wave is reflected on the ground or the sea surface and received.

According to the embodiment of the present invention, transmitting the transmission pulse is not required to be completed before arrival of the answering wave. Hence, a radar having high short-range resolution can be implemented without shortening a pulse width. Therefore, the occupied band width required for a landing assist radar can be made narrower than a value determined by the expression of "light speed divided by the minimum measurable distance."

Since the occupied bandwidth required by the radar can be made narrow, the carrier wave of the radar can be lowered to a relatively-low frequency. Incidentally, in the case of a wave source (e.g. an antenna in the case of an electromagnetic wave) which is on the same scale as that of a wavelength, a wave spreads to lateral direction of the wave source as well as to the front of the wave source, and this is not peculiar to an electromagnetic wave. Therefore, the carrier wave of the radar can be lowered to a relatively-low frequency, and hence the wavelength of the carrier wave is made equal to the order of the width of a vehicle or an aircraft, whereby a radar capable of covering a wide angle can be implemented.

Since a frequency band of 300 [MHz] used for the keyless entry system has a wavelength of the order of 1 m, it was difficult to use the frequency band for a carrier wave of a radar. However, the carrier wave of the radar of the present invention can be lowered to a relatively-low frequency, and hence the frequency band and the high-frequency circuit for the radar can be shared with the keyless entry system.

In general, the lower the frequency of a wave, the smaller the amount of attenuation causes. The carrier wave of the radar of the present invention can be lowered to a relatively-low frequency, and hence transmission power can be lowered to a relatively-low level.

Moreover, the occupied band width can be made relatively narrower. Therefore, a band of a UWB radar of the present invention can be assigned at a vacant band between frequency bands assigned to other systems, such as a WiMAX, thereby avoiding occurrence of radio interference.

Other aspects and advantages of the invention will be apparent from the following description and the appended claims.

DETAILED DESCRIPTION

Principle of the Present Invention

First, the principle of the present invention will be described prior to description of first and second embodiments. In a pulse radar system, an increase in short-range resolution involves broadening of an occupied bandwidth, since a pulse width needs to be shortened. Therefore, in order to achieve an objective for implementing a radar having high short-range resolution in a narrow bandwidth, the short-range resolution must be increased without shorting the pulse width. If transmitting a transmission pulse is not completed before arrival of an answering wave from a target located at the closest position, it would be difficult to measure a distance on the basis of a time answering waves require to return from individual targets because of interference of a transmission pulse and interference of the answering waves from the respective targets. For this reason, the pulse width must be shortened in order to enhance the short-range resolution. Consequently, the radar which has high short-range resolution in a narrow band can be achieved by realizing two new means as follows.

Figure 1:
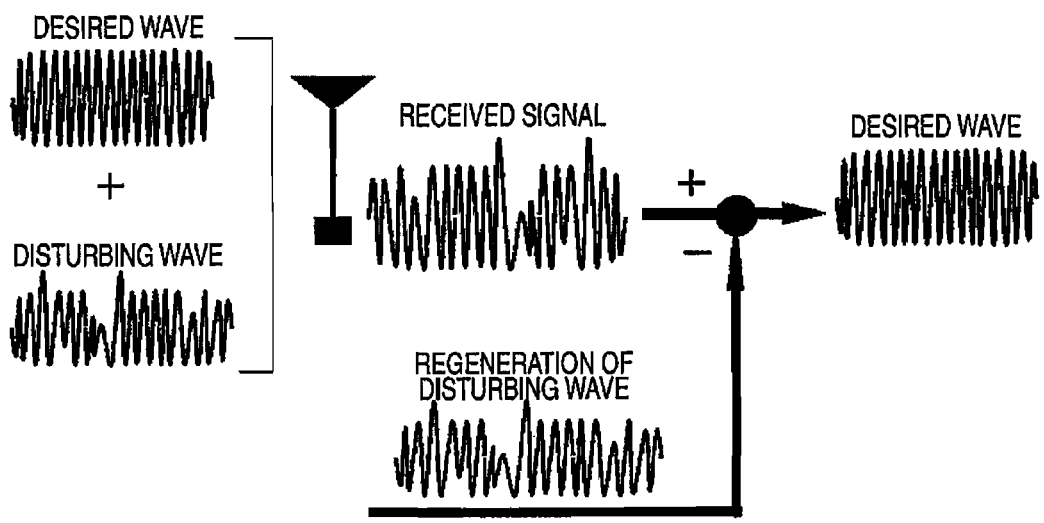
FIG. 1 is a descriptive view of filtering of interference induced by a transmission pulse.

(1) Device for eliminating from a received waveform a transmission pulse interfering with an answering wave (2) Device for detecting the time of a pulse rise and the time of a pulse fall of an answering wave from each of targets First, a method for implementing the device (1) will be described. Since a transmission waveform is generated by the radar, the waveform is known waveform. However, the transmission waveform interfering with an answering waveform has been distorted by an antenna or a propagation space. Therefore, from the view point of signal processing, in relation to the transmission pulse interference with a received waveform, as shown in FIG. 1, an answering wave signal is a desired signal to be obtained, a transmission pulse is deemed to be a known interference wave, and an antenna and a propagation space is deemed to be unknown filters for the interference wave. The interference is equivalent to a problem of an echo canceller in phone communication disclosed in a publication "Adaptive Signal Processing" (Sigeo TSUJII, Shokodo Co., Ltd., May 1995) and a problem of an adaptive noise canceller in a communications system disclosed in JP-A-05-56009. Therefore, eliminating the transmission waveform interfering with the answering waveform from the received waveform can be achieved by estimating a parameter of an adaptive filter so as to become equivalent to an antenna or a propagation space and subtracting a signal which is a result of the transmission pulse being subjected to action of the adaptive filter from the received waveform.

According to the prior art disclosed in JP-A-05-56009, a transmission pulse train is dynamically changed by communication data, and hence a modulated wave of the transmission pulse train which acts as an interference wave is also dynamically changed. Consequently, the parameter of the adaptive filter must be set by learning processing without teacher. However, in the case of radar, the transmission pulse train iterates the same transmission pattern at all times, and hence a modulated waveform of the transmission pulse train acting as an interference wave also iterates the same waveform. In short, in the case of the radar, a transmission pulse serving as an interference wave can be deemed to be known. In this case, a parameter of an adaptive filter becoming equivalent to an antenna or a propagation space can be determined by supervised learning processing. Specifically, an error signal is calculated by subtracting from the received waveform a result by applying the adaptive filter to a transmission pulse. Next, the parameter of the adaptive filter is adjusted in advance such that the error signal becomes gaussian noise (an uncorrelated signal) when no target is present.

Figure 2:
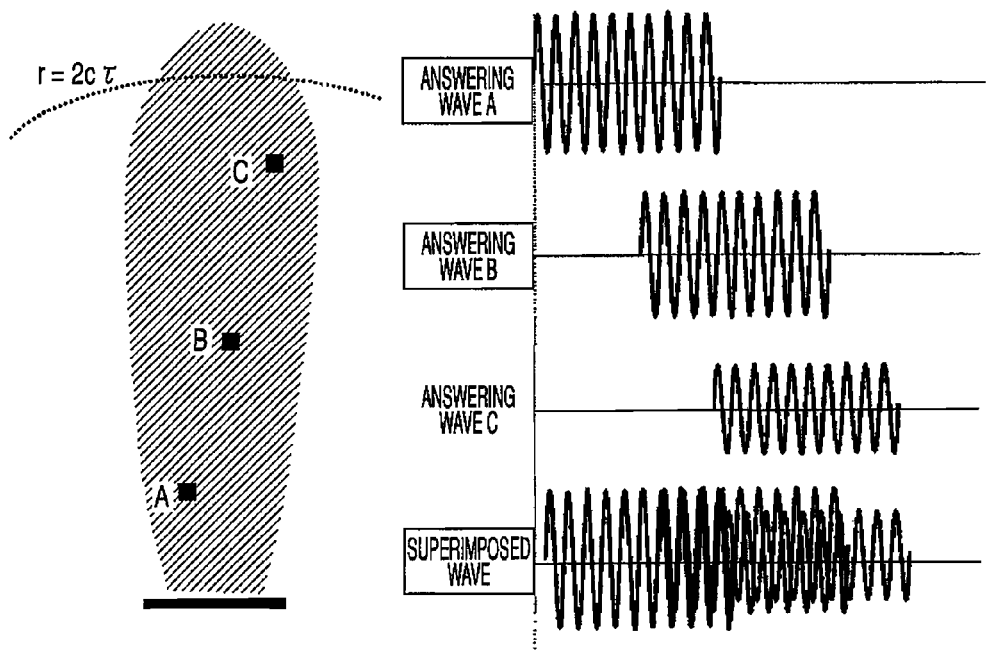
FIG. 2 is a descriptive view of interference induced by an answering wave from a target.

Next, a method for implementing the device (2) will be described. In the embodiment of the present invention, a time difference between the time of a pulse rise in an answering wave from each target and the time of a pulse rise of a transmission pulse, or a time difference between the time of a pulse fall of the answering wave and the time of a pulse fall of the transmission pulse is determined by utilization of a transient phenomenon which arises as a result of arrival of a new answering wave. As shown in FIG. 2, consideration is given to a case where three targets A, B, and C are present at positions where one-half or less of a distance over which an electromagnetic wave propagates within a duration of a transmission pulse is achieved. In this case, at the time of receiving, an answering wave from the target B and an answering wave from the target C sequentially arrive during continuation of an answering wave from the target A. Thus, the three answering waves are superimposed one on the other.

Provided that the amplitude of a superimposed wave is "a", the phase of the superimposed wave is $\psi$, the amplitude of a new answering wave or the amplitude of an answering wave which ends is "b", the phase of the answering wave is $\phi$, and the phase of the answering wave achieved after arrival or completion is $\alpha$. A superimposed wave achieved after arrival or completion of an answering wave can be expressed by Mathematical Expression 1 and Mathematical Expression 2 provided below.

$$a \cdot \sin(\omega t + \Psi) \pm b \cdot \sin(\omega t + \phi) = \\ a\{1 + (b/a)^2 + 2(b/a) \cdot \cos(\Psi - \phi)\} \cdot \\ \sin(\omega \pm \alpha)$$

[Mathematical Expression 1]

-continued $$\alpha = \tan^{-1}\left\{\frac{\sin(\Psi) \pm (b/a)\cdot\sin(\phi)}{\cos(\Psi) \pm (b/a)\cdot\cos(\phi)}\right\}$$ [Mathematical Expression 2]

In a composite symbol ±, symbol + designates arrival of a new answering wave, and symbol − designates end of an answering wave. Consequently, when answering waves arrive sequentially, the phase of a new answering wave differs from the phase of an arrived answering wave. A new answering wave interferes with an answering wave having already arrived. As a result, a region where the amplitude of the answering wave is intensified and a region where the amplitude of the answering wave is weakened are mixed together, and an envelope component changes in a complicate manner. This means that the intensity of a received signal does not necessarily increase even when another new answering wave has arrived. In an extreme case, when the phase of a newly-arrived answering wave is shifted from the phase of an arrived answering wave by 180° (a half-wave length), the new answering wave and the arrived answering wave cancel each other out completely. In this case, when a received wave is demodulated as in the case of conventional pulse radar, only a complicatedly-changed envelope component is extracted, thereby causing extreme difficulty in detecting arrival of a new answering wave. Furthermore, when the received wave is demodulated, there also arises a problem of a rise of the answering wave becoming slow.

Figure 3:
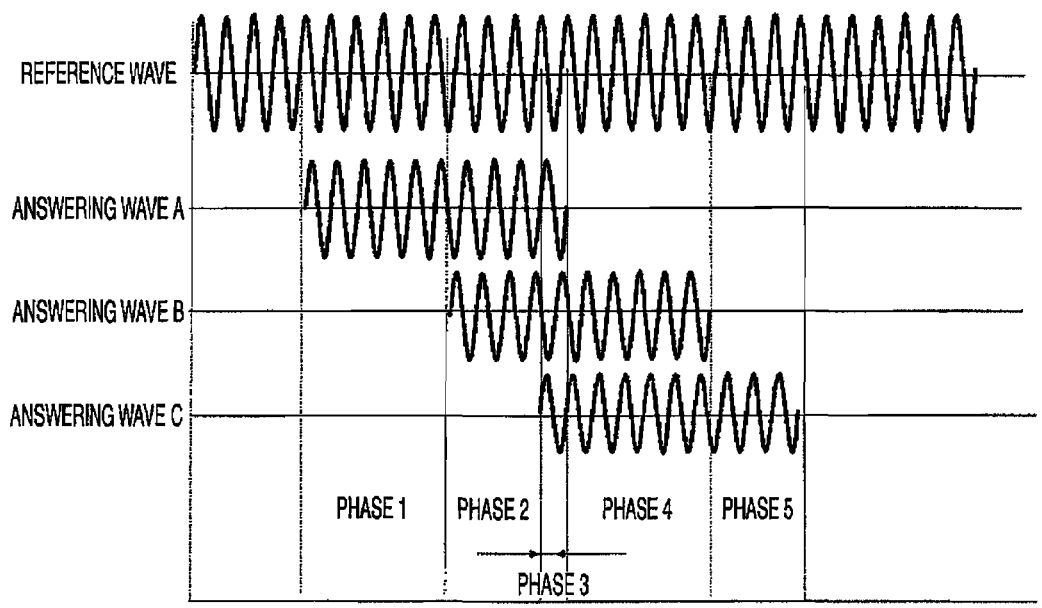
FIG. 3 is a timing chart of interference induced by the answering wave from the target.
Figure 4:
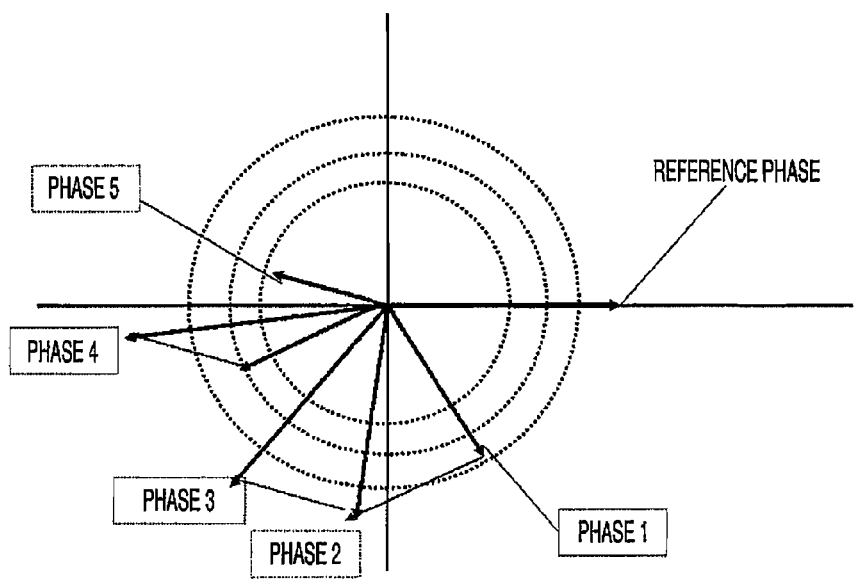
FIG. 4 is a descriptive view of a phase change in a superimposed wave induced by interference of the answering wave.

However, as shown in Mathematical Expression 1 and FIGS. 3 and 4, when a new answering wave from a target has arrived at the time of superposing of the answering wave, the phase of the new answering wave lags behind the phase of the arrived answering wave. The phase of the received waveform becomes rapidly delayed within a short period of time. Moreover, even when the arrived answering wave from a certain target is completed, the phase of the arrived answering wave from a certain target has advanced when compared with the phase of the superimposed wave, the phase of the received waveform lags rapidly within a short period of time.

As indicated by Mathematical Expression 2, the delay of the phase associated with arrival and completion of an answering wave is barely observed when a large difference exists between the signal intensity of the superimposed wave and the signal intensity of the answering wave which arrives or ends. In general, the signal intensity of an answering wave of a radar becomes smaller in proportion to the fourth power of a distance. When a transmission pulse remains active, an answering wave from a close target arrives, and an answering wave of a previous transmission pulse from a distant target ends. Therefore, in relation to a phase delay, a phase delay induced as a result of arrival of the answering wave, which has strong signal intensity, i.e. which is reflected from a close target, becomes predominant. In the meantime, when a transmission pulse remains inactive, an answering wave from a distant target arrives, and an answering wave from a close target ends. Therefore, in relation to a phase delay, a phase delay induced as a result of end of the answering wave, which has strong signal intensity, i.e. which is reflected from a close target, becomes predominant. Consequently, a phase delay arising when the transmission pulse remains active means a phase delay induced as a result of arrival of a new answering wave, and a phase delay arising when the transmission pulse remains inactive signifies a phase delay induced as a result of completion of an answering wave.

In view of the characteristic above, in the present invention, a phase change detector is applied to a modulated wave after filtration to extract a rapid phase delay induced by arrival or completion of an answering wave. As a result, a time difference between the rise time of an answerback wave from each of targets and the rise time of a transmission pulse and a time difference between the fall time of the answering wave and the fall time of the transmission pulse can be determined by a time when the phase delay extracted by the phase change detector has exceeded a threshold value. When a target is present within a distance to cτ/2, a target which is present in a range from cτ/2 to cτ cannot be detected. However, when a target is not present within the distance to cτ/2, a target which is present in a range from cτ/2 to cτ can also be detected, and hence no practical problem arises.

Figure 5:
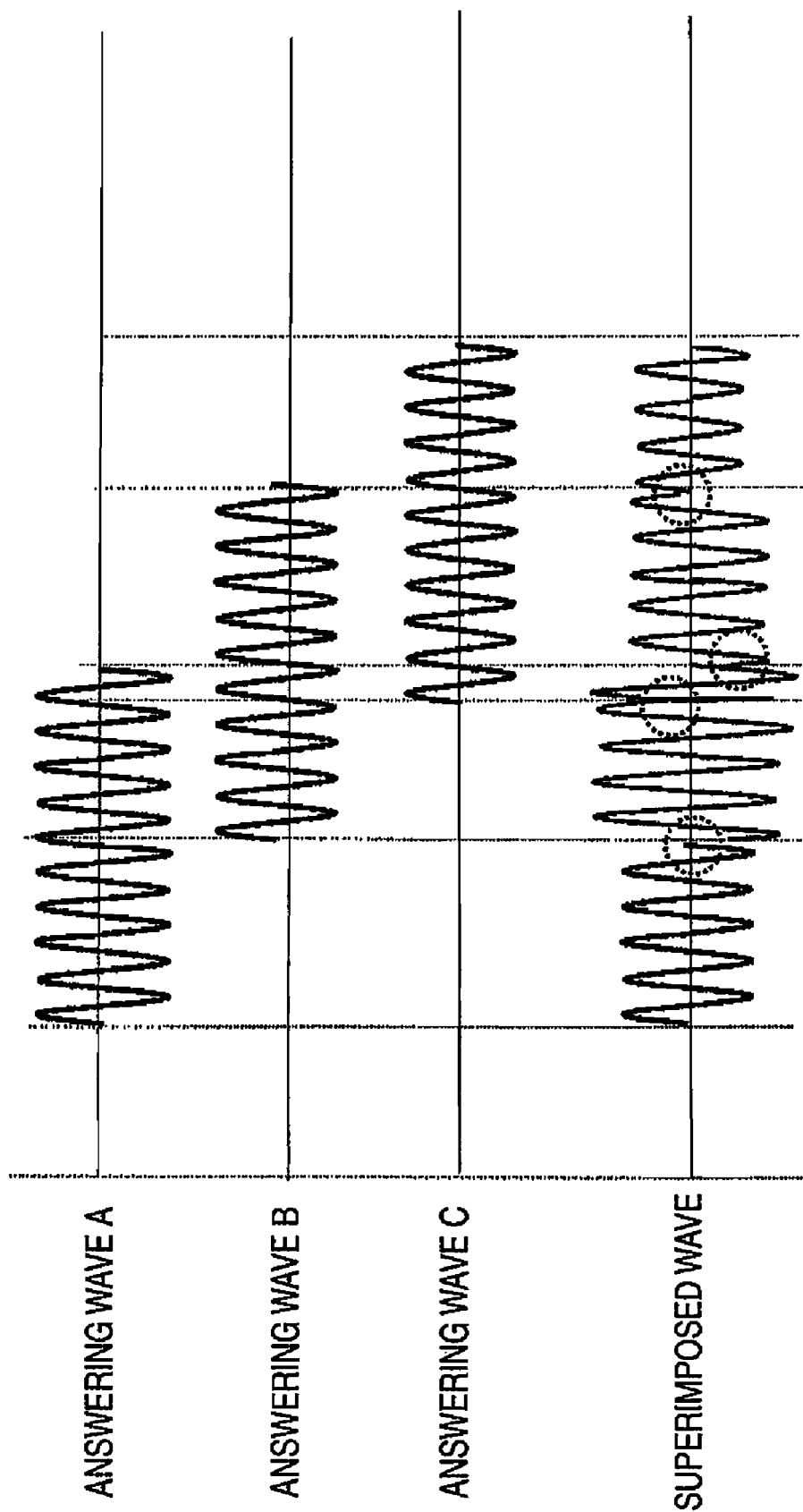
FIG. 5 is a descriptive view of a location where a harmonic arises as a result of interference of the answering wave.

As shown in FIG. 5, a nonsmooth waveform (a differential coefficient becomes discontinuous) arises in the modulated wave in conjunction with occurrence of the rapid phase delay induced by arrival or completion of the answering wave. When the nonsmooth waveform has arisen, a signal (hereinafter called a "harmonic") whose frequency is higher than the frequency of a fundamental waveform (the frequency of a carrier wave in the present case) arises according to Fourier analysis. Accordingly, the filtered, modulated harmonic is subjected to the harmonic detection filter, thereby causing only a signal having a frequency higher than the frequency of the carrier wave to pass through and enhancing the signal. Thus, only the harmonic arising at the time of arrival of a new answering wave is extracted. Thus, a time difference between the rise time of an answerback wave from each of targets and the rise time of a transmission pulse and a time difference between the fall time of the answering wave and the fall time of the transmission pulse can be determined by a time when the harmonic extracted by the harmonic detection filter has exceeded a threshold value.

A duration of the phase delay extracted by the phase change detector and the duration of the harmonic extracted by a band-pass filter are extremely shorter than the duration of the transmission pulse. Hence, applying the phase change detector and the harmonic detection filter to a signal having answering waves from the respective targets achieves an effect equivalent of shortening a pulse width.

Finally, a case where the rise of the answering wave is detected and a case where the fall of the answering wave is detected are compared with each other. The signal intensity of a newly-arrival answering wave becomes gradually smaller. A delay in the phase of the superimposed wave induced by arrival of an answering wave becomes gradually smaller, because the difference between the signal intensity of the superimposed wave and the signal intensity of the arrival answering wave becomes greater. In the meantime, at the end of the answering wave, answering waves from close targets sequentially end, and hence the signal intensity of the answering wave which ends accounts for the majority of the intensity of the entire superimposed wave. Therefore, a delay in the phase of the superimposed wave induced by completion of the answering wave can be held within an essentially-constant range by AGC (Automatic Gain Control) or the like. Thus, detecting a time difference between the fall time of the answering wave and the fall time of the transmission pulse is generally advantageous for detecting a delay in the phase of the superimposed wave.

Namely, the adaptive filter and the harmonic detection filter above enables enhancement of short-range resolution without shortening a pulse width. Thus, a radar having high short-range resolution in a narrow band can be realized. Each of two embodiments described in detail hereinafter provides direct conversion of a modulated wave from an analogue signal into a digital signal without demodulation of the modulated waveform. Since a transmission waveform interfering with an answering waveform is eliminated from a received waveform, a radar having high short-range resolution in a narrow band is implemented by the device (1) for subtracting a signal, which is obtained by subjecting the transmission pulse to the adaptive filter, from the received waveform and the device (2) for detecting a transient phenomenon arising at the time of arrival or completion of an answering wave from a target in order to determine a time difference between the rise time of an answering wave from each of targets and the rise time of a transmission pulse or a time difference between the fall time of the answering wave and the fall time of the transmission pulse.

First Embodiment of the Present Invention

Figure 6:
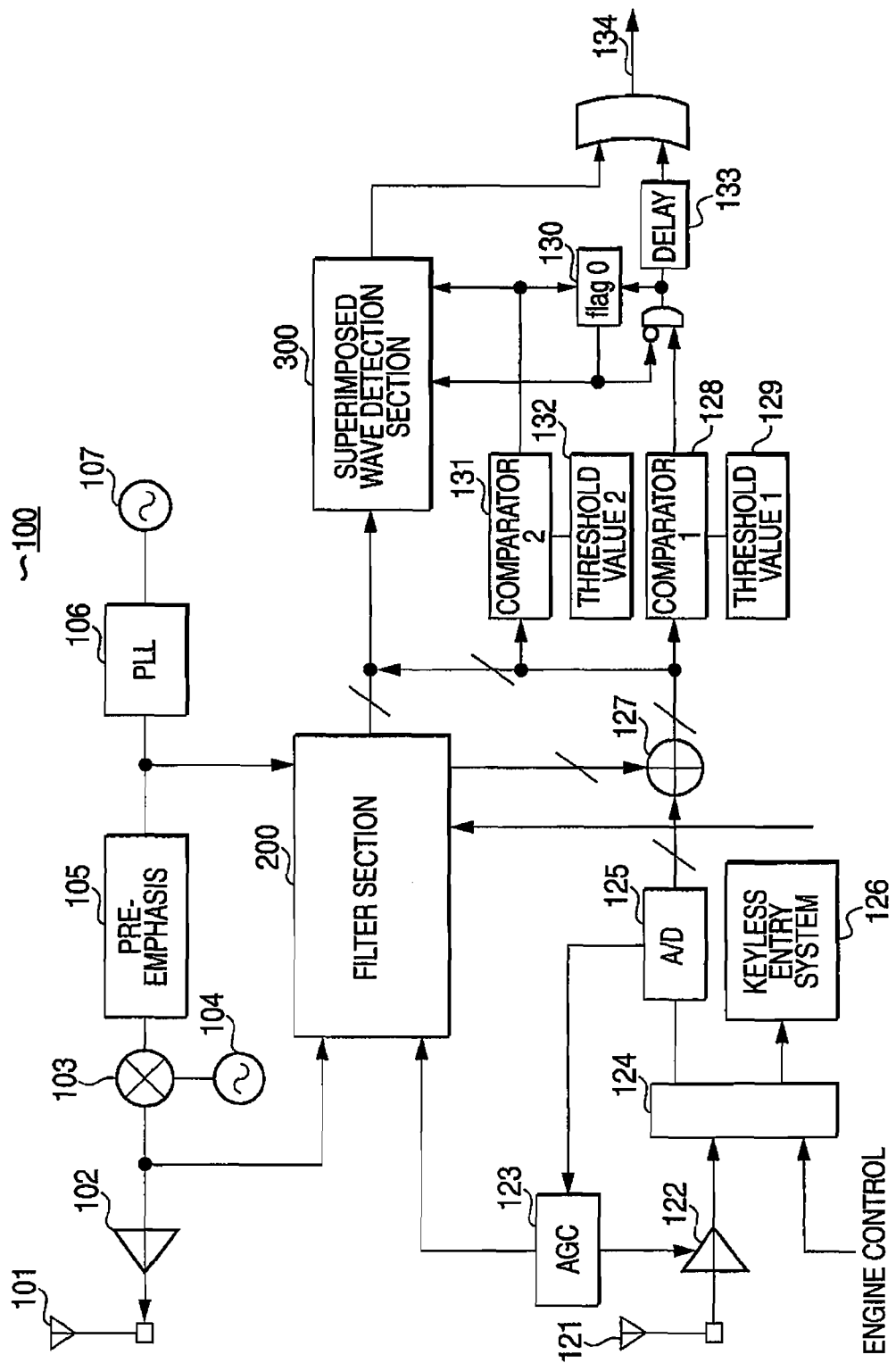
FIG. 6 is a block diagram of a short-range pulse radar of a first embodiment.
Figure 7:
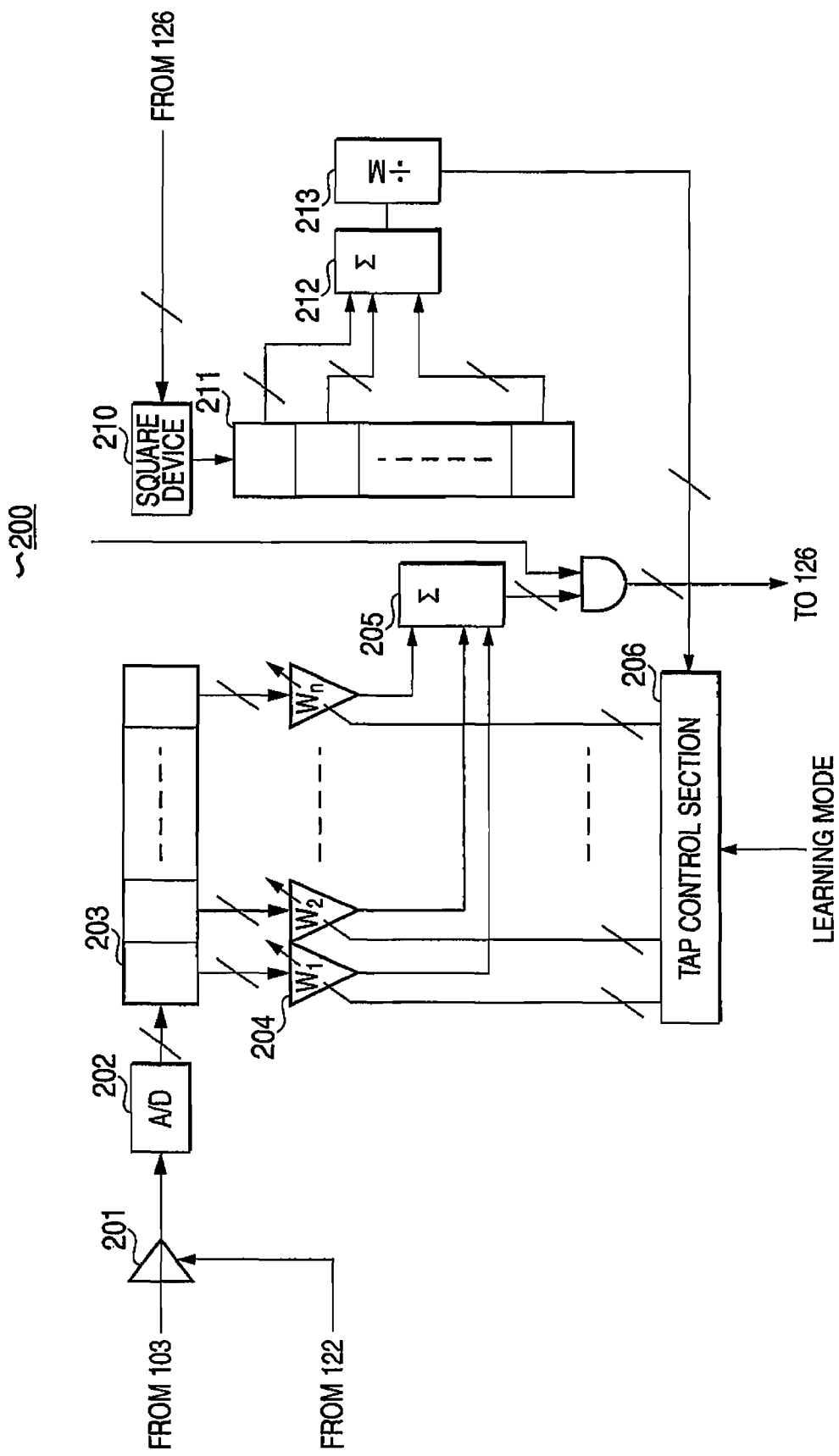
FIG. 7 is a block diagram of an adaptive filter of the first embodiment.
Figure 8:
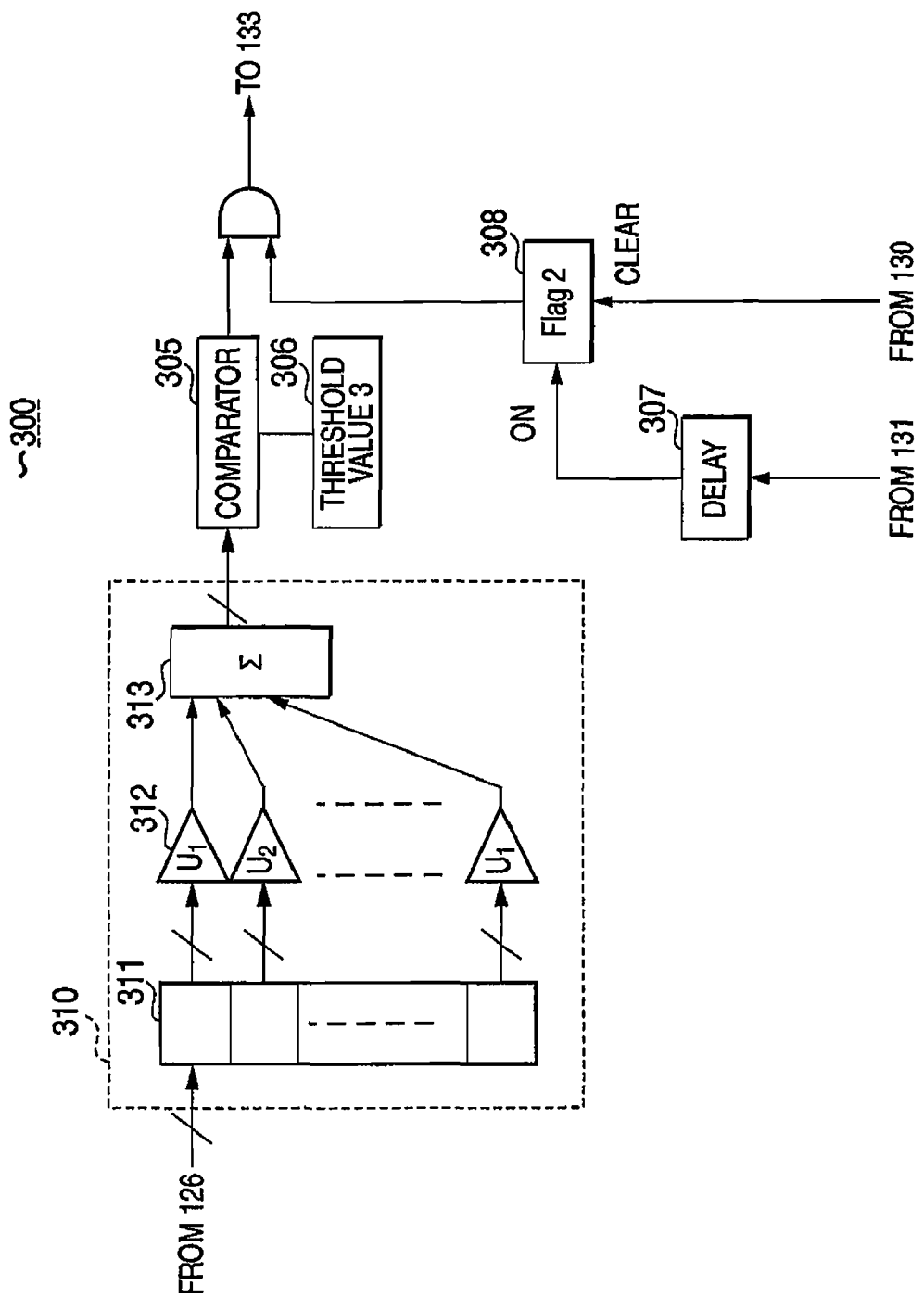
FIG. 8 is a block diagram of a superimposed wave detection filter of the first embodiment.

FIGS. 6 through 8 are block diagram of a system of a first embodiment of the invention. In the first embodiment, a radar having high short-range resolution in a narrow band is applied to a short-range radar intended for use with an automobile drive assist system, and a frequency band and a high-frequency circuit are shared with a keyless entry system. The keyless entry system is used to open and close doors of a parked car which an engine is inoperative. The short-range radar intended for use with a drive assist system is used while the engine is in operation. Since simultaneous use of both the keyless entry and the short-range radar during ordinary operation is impossible, shared use of the frequency band and the high-frequency circuit poses no problems. Moreover, a wavelength in a frequency band of 300 [MHz] used for the keyless entry usually assumes a value of about 1 m. Hence, the wavelength is becomes equal to the width of a vehicle body in terms of an order, thereby enabling coverage of a wide angle.

A filter section 200 built from a linear adaptive filter is added, as means for eliminating a transmission waveform interfering with an answering waveform from a received waveform, to a feedback line connected to a transmission circuit. A bandpass filter 310 for extracting a harmonic occurring when an answering wave has become unsmooth is added to a superimposed wave detection section 300 as means for detecting arrival of a new answering wave from a target. The reason why a band-pass filter is used to extract a harmonic rather than a high-pass filter is that the bandpass filter enables prevention of inflow of unwanted noise when compared with the high-pass filter which enables additional passage of unwanted noise. Even when the roundtrip propagation time required to make a roundtrip to the target has come to a duration time of a pulse width or less, above-mentioned devices enable determination of a time difference between the rise time of the answering wave from each of the targets and the rise time of the transmission pulse, and a radar having high short-range resolution in a narrow range is realized.

And also, a changeover switch 124 is added for enabling shared use of the frequency band and the high-frequency circuit with the keyless entry system. In a state where the engine is inoperative, the frequency band and the high-frequency circuit are switched to the keyless entry system by the changeover switch 124. Moreover, in a state where the engine is in operation, the frequency band and the high-frequency circuit are switched to the short-range radar. In the present embodiment, shown in FIG. 9, the waveform of the transmission pulse is somewhat over-damped to enhance the rise and fall of the pulse by a pre-emphasis circuit 105, because the rise and fall of the answering wave are important.

Figure 10:
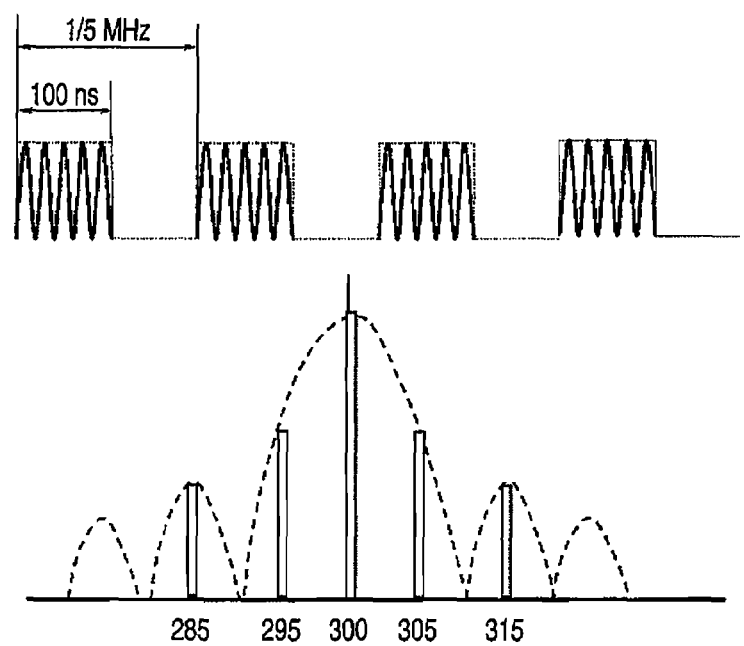
FIG. 10 is a descriptive view of a pulse waveform and a spectrum arrangement of the first embodiment.
Figure 11:
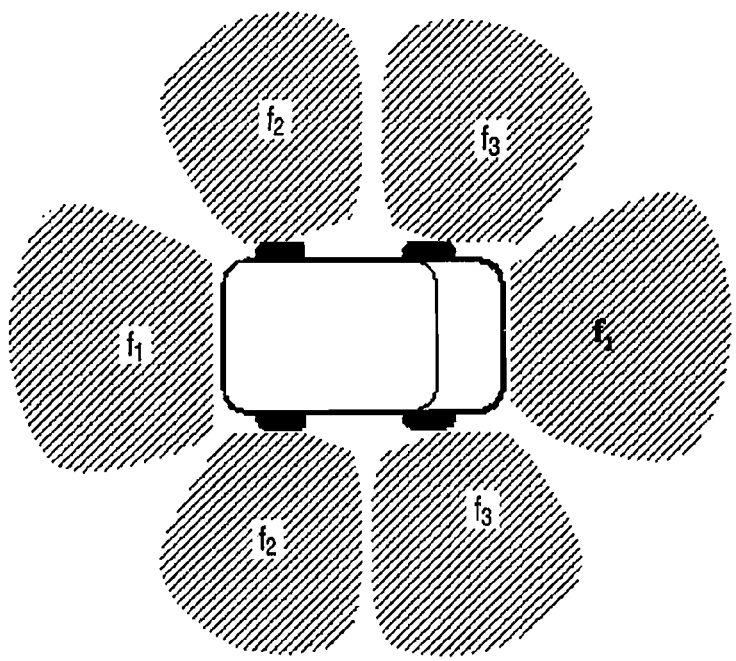
FIG. 11 is a descriptive view of a spatial arrangement of a frequency of the first embodiment.

FIG. 10 shows a pulse waveform of the present embodiment and a spectrum arrangement of the pulse waveform. In the present embodiment, the pulse width is set to 100 [nsec] corresponding to a half-wave length of a sinusoidal wave of 5 [MHz]. A period of generation of a pulse is set to 200 [nsec] which is double the pulse width. The pulse waveform is approximated by sinusoidal waves from same period to one-third period of the pulse in order to transform the pulse waveform to a somewhat over-damped waveform exhibiting an enhanced rise. As a result, provided that the frequency of a carrier wave is taken as 300 [MHz], the spectrum of the pulse is made up of five line spectra of 285 [MHz], 295 [MHz], 300 [MHz], 305 [MHz], and 315 [MHz]. Therefore, a frequency band from 285 [MHz] to 320 [MHz] can be shared among a plurality of users, by slightly shifting the frequency of a carrier wave, rather than by a single user (when a frequency band is shifted in increments of; for example, 0.1 MHz, 100 users can share the frequency band). Even when the frequency band is used by a single user, radars can be set at a plurality of locations without involvement of an interference. For instance, as shown in FIG. 11, a single car can utilize three waves, which one wave is for the front and back sides of a vehicle, which another wave is for the forward left and right sides of the vehicle; and which still another is wave for the rear left and right sides of the same.

In a case where rigorous regulation values are imposed on low power radio particularly in excess of 322 MHz, as in Japan, comparatively-large radiation power can be ensured by setting a value, which is to become double the pulse period, to the proximity of the 320 MHz in order to approximate the pulse waveform by sinusoidal waves having same period, half period and one-third period of the pulse. For this reason, the pulse width is set to 100 [nsec] in the present embodiment.

The pulse width is taken as $\tau$ [sec]; a distance to a target is taken as "or" [m]; an occupied bandwidth is taken as W [Hz]; a round-trip propagation time required to make a roundtrip to a target is "t" [s]; and light speed is taken as "c" ($=3.0 \times 10^8$ [m/sec]). A condition under which the roundtrip propagation time required to make a roundtrip to a target becomes equal to or greater than a pulse width is $\tau \leq 2r/c$. Reference symbol A is assumed to designate an amplitude of a pulse; that $\tau$ is assumed to designate a pulse width; and T is assumed to designate a pulse generation interval. When the waveform of a pulse train is subjected to Fourier expansion, Mathematical Expression 3 provided below is acquired.

$$F(f) = \frac{A\tau}{T}\left\{1 + 2\sum_{n=1}^{\infty} \frac{\sin(2n\pi\tau/2T)}{2n\pi\tau/2T}\cos(2n\pi f/2T)\right\} \quad \text{[Mathematical Expression 3]}$$

According to Mathematical Expression 3, the waveform of the pulse train assumes the form of line spectra spaced at an interval 1/T (a reciprocal of a cycle period) in a frequency space. The waveform of the pulse train comes to zero at a point where an integral multiple of the reciprocal of the pulse width is achieved. When the pulse is not iterative and when only one isolated pulse is present, the cycle period becomes infinite, and a continuous spectrum appears. However, when the pulse is iterative, line spectra appear at an interval 1/T. Therefore, the shorter the interval of pulse generation, the smaller the number of line spectra required to approximate a pulse waveform. Thus, shared use of a single frequency band among a plurality of users is effective. In the meantime, from the point of view of an extension of a range of measurement of the radar to a far distance, a greater advantage is gained as the interval of appearance of the pulse becomes longer. A pulse width of 100 [nsec] corresponds to 60 m in terms of a distance. This means that a range required by the short-range radar is surpassed by only the pulse width. Hence, there is no necessity for intentionally rendering the interval of pulse generating longer. If anything, enabling shared use of a single frequency band by decreasing the number of line spectra is more advantageous. For this reason, the period of appearance of a pulse is set to 100 [nsec] which is double the pulse width.

As shown in FIG. 6, in addition to a transmitting section and a receiving section which are provided in an existing pulse radar, the configuration of the short-range radar of the embodiment includes the filter section 200 for eliminating a transmission waveform interfering with an answering waveform from a received waveform and the superimposed wave detection section 300 for extracting a harmonic occurring at the time of arrival of a new answering wave from a target.

As in the case of the existing pulse radar, the transmitting section is built from an oscillator 107 of 5 [MHz] intended for generating a clock signal, a PLL (Phase-Locked Loop) 106, a pre-emphasis circuit 105; an oscillator 104 for generating a carrier wave; a modulator 103, an output amplifier 102, and a transmission antenna 101. Of these elements, the PLL 106 generates a rectangular wave of 5 [MHz] from a sinusoidal wave of 5 [MHz] from the oscillator 107. The pre-emphasis circuit 105 generates overdamping pulse waveform which is enhanced rise of a rectangular wave.

Since the receiving section detects a rise of an answering wave, the receiving section considerably differs from its counterpart section in the existing pulse radar. The receiving section is built from a receiving antenna 121, an RF amplifier 122, an AGC 123, a changeover switch 124 for switching between a keyless entry system and a short-range radar, an A/D converter 125 for sampling an RF signal, a comparator 128, and threshold value memory 129. Of these elements, the AGC 123 is a circuit for holding the intensity level of a received signal constant in order to effectively use all bits of the A/D converter 125. The comparator 128 is a circuit for detecting arrival of a first answering wave.

As shown in FIG. 7, the filter section 200 can be implemented by a linear adaptive filter. The filter section is built specifically from, an A/D converter 202 for sampling an RF signal, a shift register 203, a multiplier 204, an adder 205, a tap control section 206, a square device 210, and a shift register 211. Among these elements, the shift register 211, the multiplier 204, and the adder 205 generate a pseudo transmission pulse signal. When a target is not present, the tap control section 206 performs adaptive processing by changing a constant of the multiplier 204 in such a way that a sum of squares of feedback signals becomes minimum, through use of a learning algorithm such as an LMS and an RLS described in a publication; for example, "Adaptive Signal Processing" (Sigeo TSUJII, Shokodo Co., Ltd., May 1995), in order to eliminate noise to prevent detection of signal in a received signal.

As shown in FIG. 8, the superimposed wave detection section 300 is built from a band-pass filter 310, a comparator 305, and threshold value memory 306. The band-pass filter 310 is a circuit for extracting a harmonic which arises when an unsmooth waveform appears as a result of arrival or completion of an answering wave.

Figure 9:
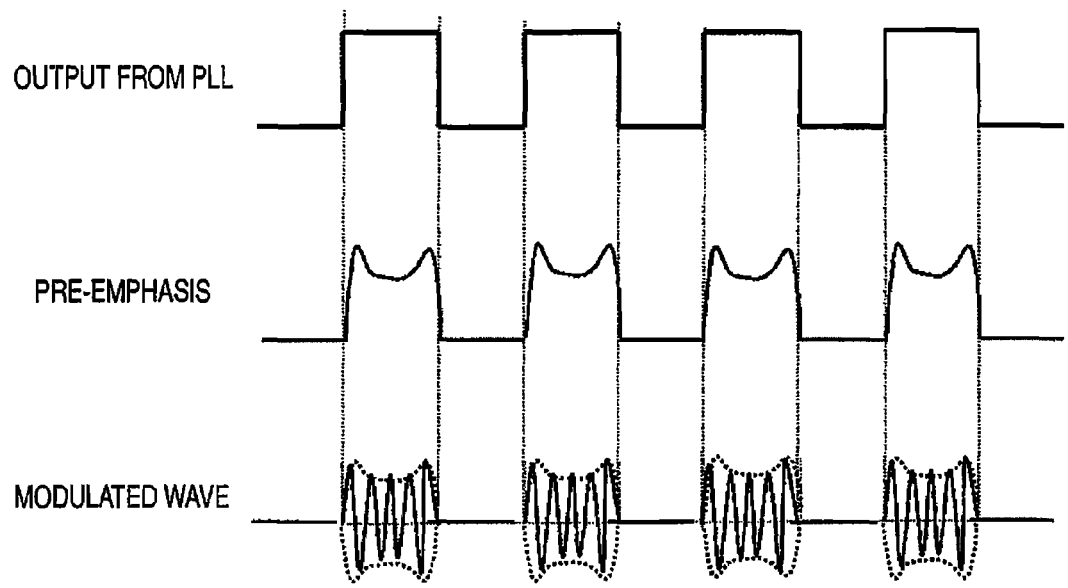
FIG. 9 is a timing chart of operation performed by a transmitting end of the first embodiment.

As shown in FIG. 9, operation of the transmitting section is substantially analogous to that of the transmitting section in the existing pulse radar. First, the oscillator 107 generates a sinusoidal wave having a period of 5 [MHz]. The sinusoidal wave having a period of 5 [MHz] is transformed into a rectangular wave by the PLL 106. The transmission pulse transformed into the rectangular wave of 5 [MHz] is transformed, by the pre-emphasis circuit 105, into a pulse waveform which is somewhat overdamped and in which the rise of a rectangular wave is enhanced. The transmission pulse transformed into the overdamped pulse waveform is modulated by the modulator 103 through use of a sinusoidal wave of 300 [MHz]. The thus modulated transmission pulse is radiated toward a target from the transmitting antenna 101 after being amplified by the output amplifier 102.

Figure 12:
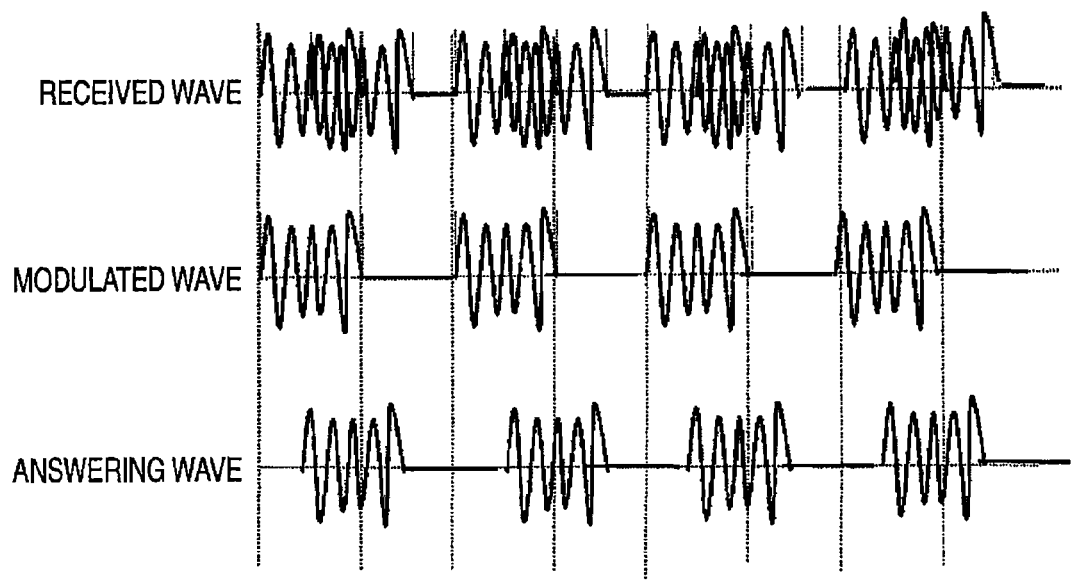
FIG. 12 is a descriptive view of filtering of interference induced by the transmission pulse.

Since the receiving section detects a rise of an answering wave, the receiving section performs operation which is considerably different from that performed by its counterpart section in the existing pulse radar. A received signal output from the receiving antenna is amplified by the RF amplifier 121. The operation of the radar mentioned thus far is the same as the operation of the existing pulse radar. However, when the engine is inoperative, the changeover switch 124 determines the received signal as a signal for the keyless entry system, and the signal is input to the keyless entry system. When the engine is in operation, the received signal is input to the A/D converter 125, where the signal is subjected to RF sampling, to thus become converted from an analogue signal into a digital signal. At this time, in order to effectively use all of the bits of the A/D converter, the AGC 123 controls a gain of the RF amplifier 122, to thus hold the intensity level of the received signal constantly. The received signal converted into a digital signal is input to the subtractor 127. As shown in FIG. 12, the pseudo transmission pulse signal generated by adaptive processing is subtracted, where upon a diffracted transmission pulse signal is deleted, to thus extract only an answering wave.

The received signal from which only the answering signal has been extracted is input as a feedback signal to the comparator 128, the comparator 131, and the superimposed wave detection section 300. In the learning mode, the signal is input as a feedback signal further to the filter section 200.

Figure 13:
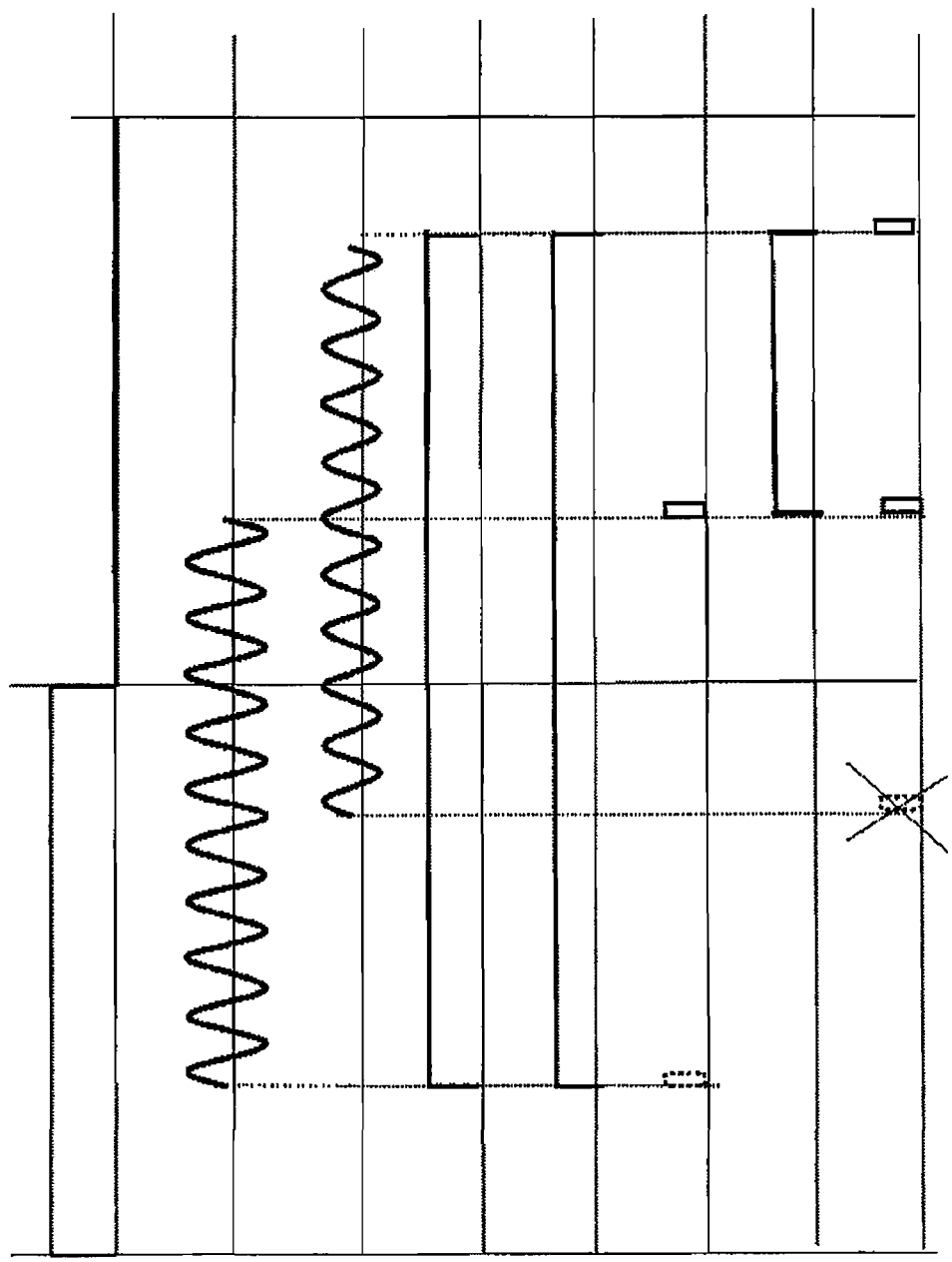
FIG. 13 is a timing chart of operation performed by a receiving end.

When the answering wave is input to the comparator 128, a determination is made as to whether or not an absolute value of the amplitude is in excess a threshold value. As shown in FIG. 13, when the absolute value exceeds the threshold value at Flag0=0, in Flag0 memory 130, which shows that an answering wave has not yet arrived, this time is taken as a time when the first answering wave has arrived, and a trigger signal is input to the delay circuit 132. Concurrently, the trigger signal is also input to the Flag0 memory 130, and Flag0 is changed to 1 (one), thereby explicitly showing that an answering wave is in the middle of arrival. When the value of the Flag0 memory 130 is changed to 1, the superimposed wave detection section 300 is informed that the answering signal is in the middle of arrival. As illustrated, the superimposed wave detection section 300 is delayed by an amount corresponding to the pulse width, and the Flag2, in Flag2 memory 308, is changed to 1 (one), thereby enabling output of an answering wave detection trigger signal.

When an answering wave is input, the comparator 131 determines whether or not an absolute value of the amplitude is smaller than the threshold value. When a phenomenon of the absolute value being smaller than the threshold value has arisen at Flag0=1, in the Flag0 memory 130, which shows that the answering wave is in the middle of arrival, the trigger signal is also input to the Flag0 memory 130 to change Flag0 to 0 (zero), thereby explicitly showing that the answering wave has not arrived. When the value of the Flag0 memory 130 is changed to 0, the superimposed wave detection section 300 is informed of completion of the answering wave. As illustrated, the superimposed wave detection section 300 changes the value of the Flag2 memory 308, i.e. Flag2, to 0, thereby stopping output of the answering wave detection trigger signal.

When the trigger signal is input to the delay circuit 132, the delay circuit 132 delays the signal by an amount corresponding to the pulse width as illustrated in order to adjust timing with detecting a superimposed wave, and a trigger signal for detecting a target is output. Through foregoing operations, a time difference between the rise time of the answering wave from each of the targets and the rise time of the transmission pulse or a time difference between the fall time of the answering wave and the fall time of the transmission pulse can be detected.

First, the filter section 200 inputs the modulated transmission pulse to the A/D converter 202, where the transmission pulse is subjected to RF sampling, to thus become converted from an analogue signal into a digital signal. At this time, the AGC controls a gain of the RF amplifier of feedback purpose, thereby holding the ratio of the received signal to the transmission pulse signal constant in terms of an intensity level. The transmission pulse transformed into a digital signal is input to the shift register 203. The transmission pulse signal input to the shift register 203 is weighted by the multiplier 204 for each sampled value, and the thus-weighted sampled values are finally superimposed one on the other in the adder 205, whereupon the thus-superimposed pulse is transformed into a pseudo transmission pulse signal. Thus, the filter section generates a pseudo transmission pulse signal for erasing the diffracted transmission pulse signal.

In the learning mode, the received signal, from which only the answering wave has been extracted, returns as a feedback signal to the filter section 200. The thus-returned feedback signal is squared by the square device 210, and the thus-squared signal is stored in the shift register 211. The feedback signal stored in the shift register is superimposed by the adder 212 for each of sampled values, thereby determining the sum of squares. The tap control section 206 changes the constant of the multiplier such that the sum of squares of the feedback signal becomes minimum. An LMS or RLS described in a publication; for example, "Adaptive Signal Processing" (Sigeo TSUJII, Shokodo Co., Ltd., May 1995), is used as the learning algorithm at this time. Thus, in the learning mode, the tap control section 206 changes the constant of the multiplier, by the learning algorithm, in such a way that the sum of squares of the feedback signals becomes minimum.

The superimposed wave detection section 300 sends the input answering wave to the band-pass filter 310. A signal output from the band-pass filter is input to the comparator 305. The comparator 305 compares the value of the signal output from the band-pass filter with the threshold value stored in the threshold value memory 306, thereby determining whether or not the absolute value of the signal output from the band-pass filter is in excess of the threshold value. At this time, a harmonic develops, and the absolute value of the signal output from the band-pass filter exceeds the threshold value. The reason why the harmonic develops is that an unsmooth waveform arises in the superimposed wave as a result of arrival or completion of the answering wave.

When the threshold value is surpassed, the time when the threshold value is surpassed is taken as a time when the answering wave has arrived or has ended. At this time, as illustrated, when Flag0=1 is achieved, Flag2 is changed to 1 in the Flag2 memory 308, and an answering wave detection trigger signal is output. When Flag0=0 is achieved, Flag2 is changed to 0, and outputting of the answering wave detection trigger signal is canceled. Thus, the superimposed wave detection section 300 produces an output only when a harmonic is generated as a result of completion of the answering wave.

As mentioned above, the transmission pulse is not required to be complete before arrival of the answering wave. Hence, a radar having high short-range resolution can be implemented without shortening a pulse width. Therefore, the occupied band width required for the radar can be made narrower than a value determined by the expression of "light speed divided by the minimum measurable distance."

Since the occupied bandwidth required by the radar can be made narrow, the carrier wave of the radar can be lowered to a relatively-low frequency. In the case of a wave source (an antenna in the case of an electromagnetic wave) which is on the same scale as that of a wavelength, a wave spreads to side surfaces of the wave source as well as to the front of the same, and this is not peculiar to an electromagnetic wave. Therefore, the carrier wave of the radar can be lowered to a relatively-low frequency, and hence the wavelength of the carrier wave is made equal to the order of the width of the vehicle or the aircraft, whereby a radar capable of covering a wide angle can be implemented.

A frequency band of 300 [MHz] used for the keyless entry system has a wavelength of the order of 1 m, and difficulty has hitherto been encountered in using the frequency band of 300 [MHz] for a carrier wave of a radar. However, the carrier wave of the radar of the present embodiment can be lowered to a relatively-low frequency, and hence the frequency band and the high-frequency circuit for the radar can be shared with the keyless entry system.

In general, the lower the frequency of a wave, the smaller the amount of attenuation causes. The carrier wave of the radar can be lowered to a relatively-low frequency, and hence transmission power can be lowered to a relatively-low level.

Second Embodiment of the Present Invention

Figure 14:
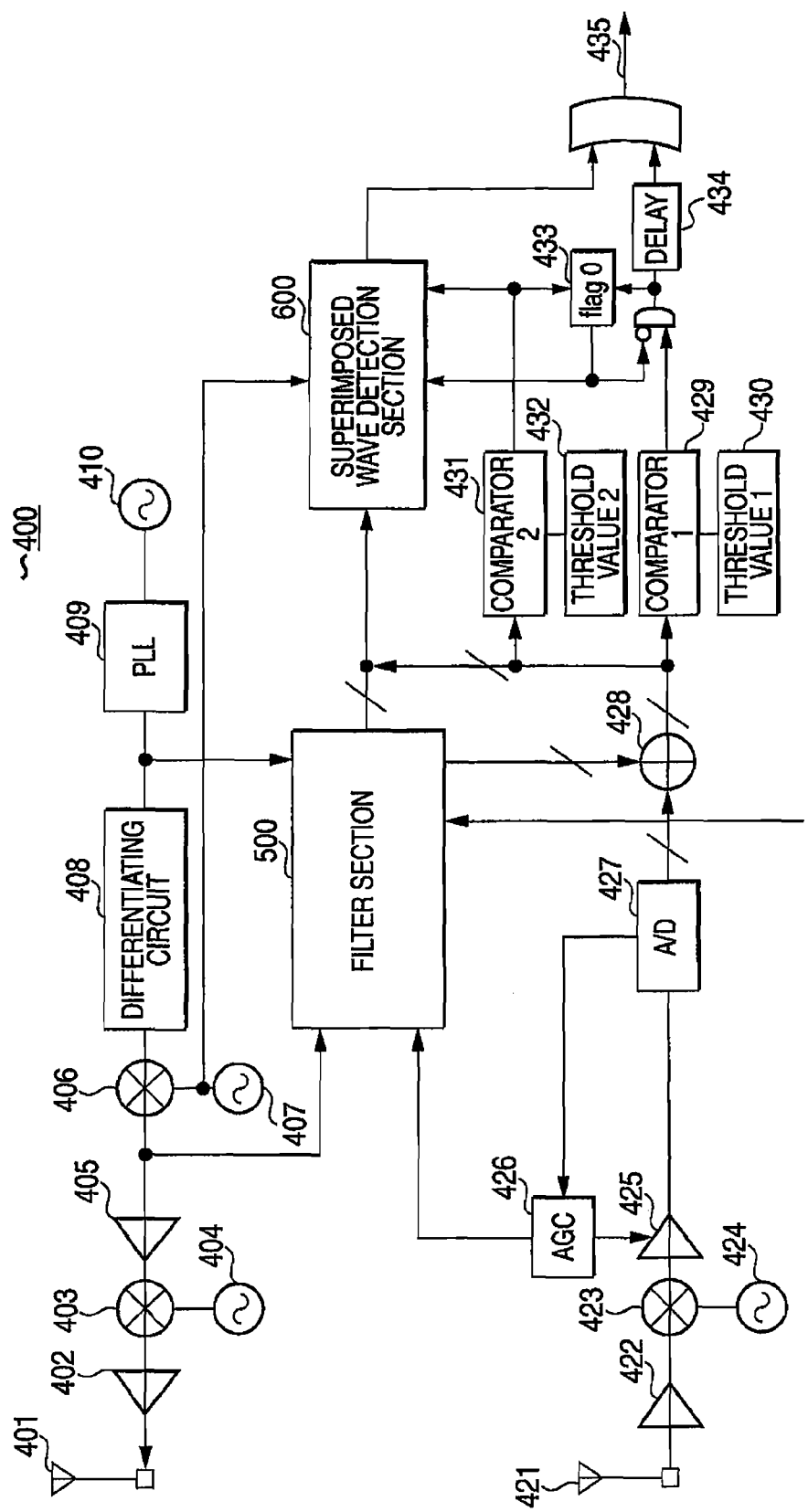
FIG. 14 is a block diagram showing a short-range pulse radar of the second embodiment.
Figure 15:
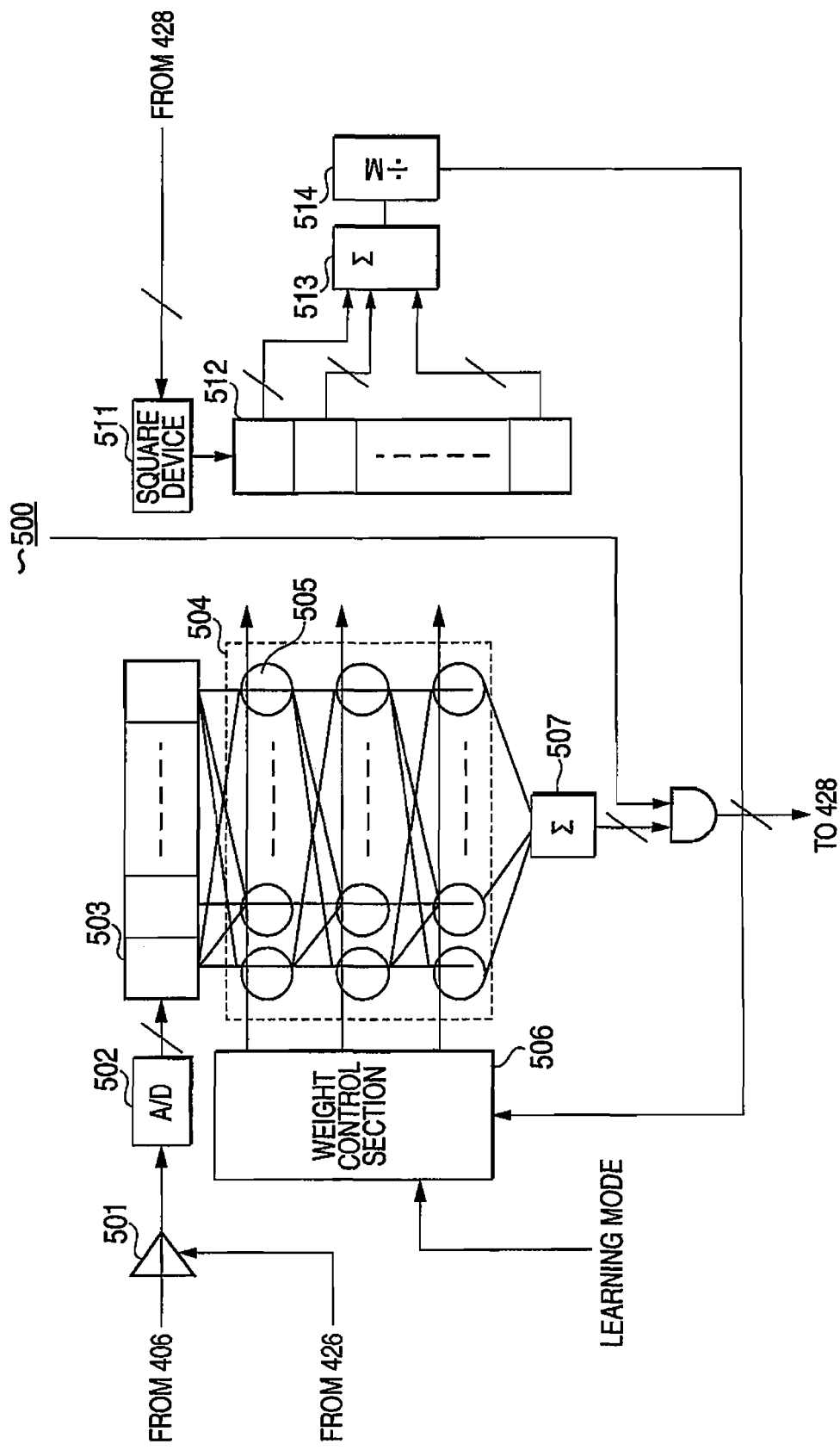
FIG. 15 is a block diagram of an adaptive filter of the second embodiment.
Figure 16:
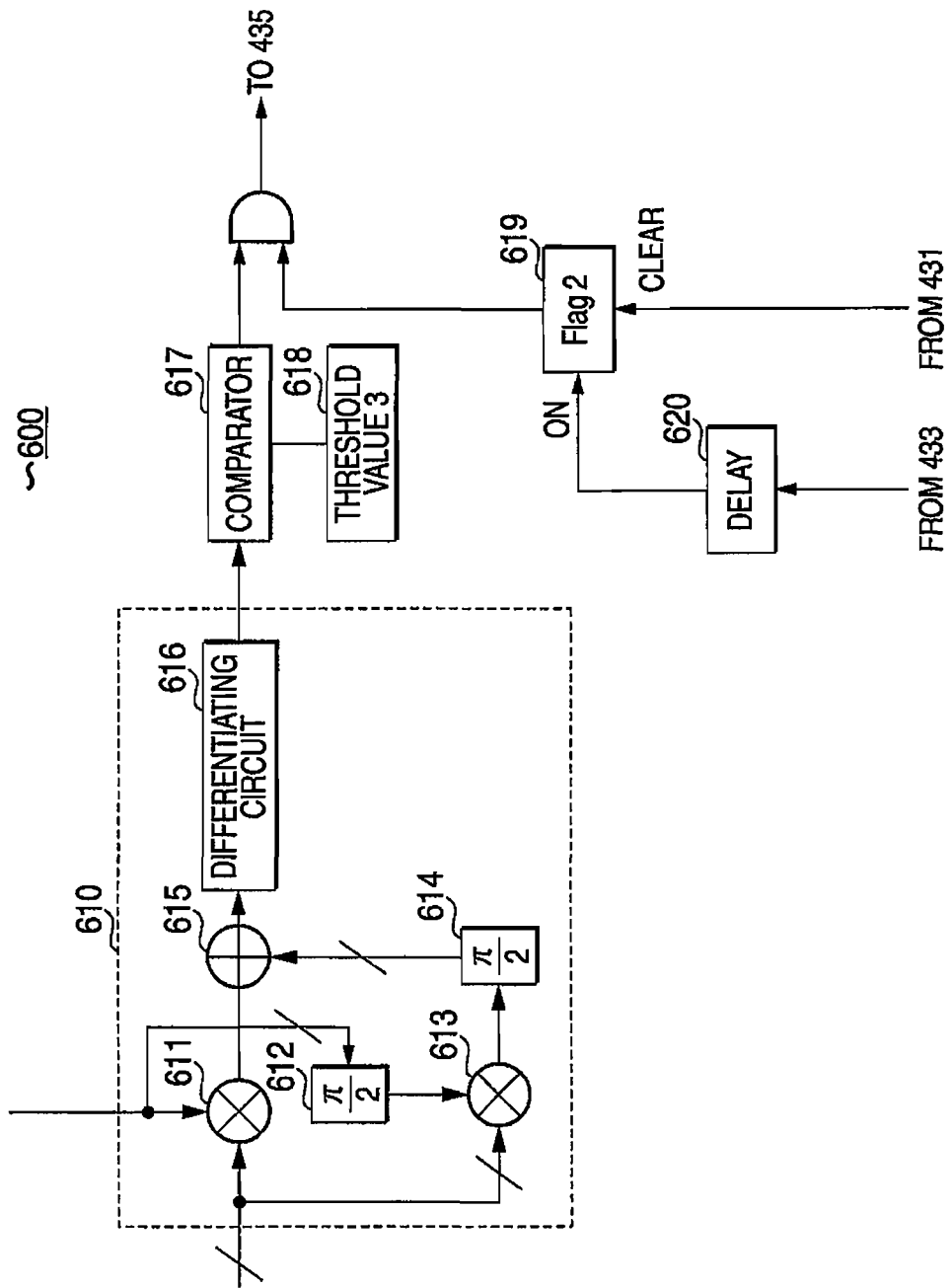
FIG. 16 is a block diagram of a superimposed wave detection filter of the second embodiment.

FIGS. 14 through 16 are block diagrams of a system of a second embodiment of the present invention. In the present embodiment, a radar of the present embodiment having high short-range resolution in a narrow band is used as a landing assist radar intended for assisting landing operation of a helicopter or the like. When compared with a radar intended for use with an automobile driving assist system, the landing assist radar requires a comparatively-long range, and hence a UWB (Ultra Wide Band) is used.

A nonlinear effect in a UWB multiplier is not negligible, and hence a neural network capable of addressing a nonlinear effect is added to a feedback line from the transmission circuit as means for eliminating a transmission waveform interfering with an answering waveform from a received waveform. Moreover, a phase change detector 610 for extracting a rapid phase delay is added as means for detecting arrival or completion of an answering wave. A time difference between a rise time of an answering wave from each of targets and a rise time of a transmission pulse and a time difference between a fall time of an answering wave from each of targets and a fall time of the transmission pulse can also be determined by above mentioned devices even when the round-trip propagation time required to make a roundtrip to the target has become equal to or smaller than the pulse width, and a landing assist radar having high short-range resolution in a narrow band is implemented.

Figure 17:
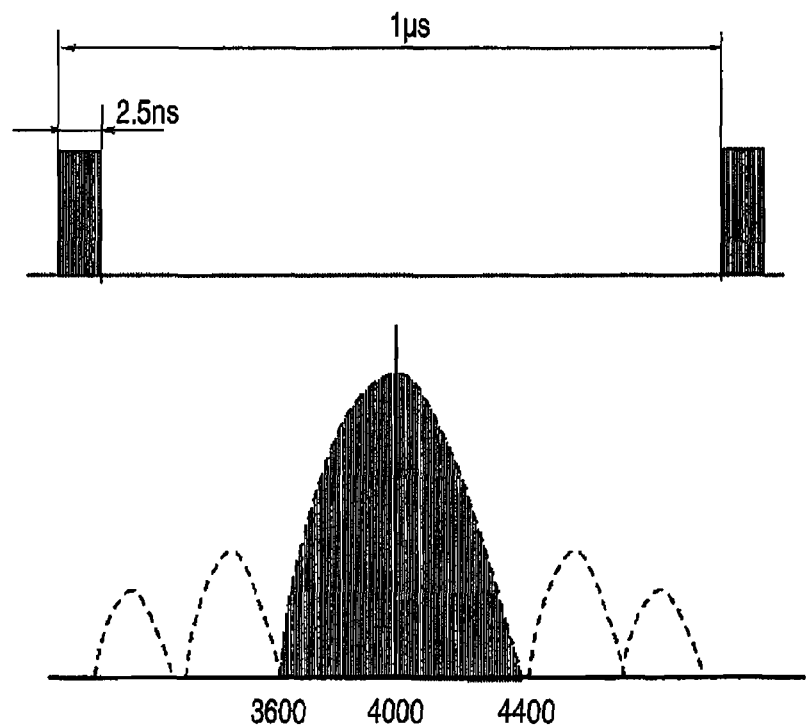
FIG. 17 is a descriptive view of a pulse waveform and a spectrum arrangement thereof according to the second embodiment.

FIG. 17 shows a pulse waveform and a spectrum arrangement thereof. Since the UWB band can ensure a comparatively-large occupied bandwidth, a pulse width is set to a short pulse of the order of 2.5 [nsec] equivalent to a half-wave length of a sinusoidal wave of 200 [MHz]. An interval at which a pulse is generated is assumed to be 1 [μsec] corresponding to one cycle of a sinusoidal wave of 1 MHz. When the pulse generation interval is extended to this cycle, the maximum search range can be extended in principle up to 150 m, so long as a sufficient signal-to-noise ratio is ensured. In this case, spectra of the pulse can be substantially deemed as a continuous spectrum because the pulse width is smaller than the pulse generation interval by a factor of 20.

Moreover, since the pulse is short, the pulse wave is not necessarily transformed to a waveform which is somewhat overdamped and whose rise is enhanced. Hence, the pulse wave is sufficiently approximated by a sinusoidal wave having same period as the pulse. Accordingly, a rise time of the clock signal is taken as 3.7 [nsec], and the rise of the clock signal is differentiated, to thus generate a short pulse. As disclosed in a publication "Basis of High-Frequency Design" (Shigeo SUZUKI, The Nikkan Kogyo Shinbun Ltd., Dec. 25, 2000), a relationship of (a time of a pulse rise)×(a signal band)=0.7 exists between the time of a pulse rise and a signal band included in the pulse, provided that a value of −9 dB is taken as a reference value. On condition that a rise time of the clock signal is 3.5 [nsec], a rise time of a short pulse acquired through differentiation comes to 1.75 [nsec] which is one-half the rise time of the clock signal. The upper limit of a frequency included in the pulse signal is defined as (a signal band)=0.7÷(a pulse rise time)=400 [MHz].

When the pulse width is taken as 2.5 [nsec], the bandwidth required for making a pulse waveform analogous to a primary wave is 400 [MHz]. Therefore, a waveform obtained by differentiating a clock signal whose rise time is 3.7 [nsec] is well approximated by the sinusoidal wave having same period of a pulse waveform having a pulse width of 2.5 [nsec]. For this reason, the pulse rise time of the clock signal is set to 3.7 [nsec].

As shown in FIG. 14, in addition to including a transmitting section and a receiving section which are provided in an existing pulse radar, the short-range radar includes a filter section for eliminating from a received waveform a transmission waveform interfering with an answering waveform and a superimposed wave detection section for extracting a harmonic arising at the time of arrival of a new answering wave from a target, as in the case of the first embodiment.

The transmitting section is built from an oscillator 411 of 1 [MHz] intended for generation of a clock signal, a PLL 409, a differentiating circuit 408, an oscillator 407 for generating an intermediate frequency, a modulator 406, an IF amplifier 405, an oscillator 404 for generating a frequency of UWB, an UWB multiplier 403, an RF amplifier 402, and a transmitting antenna 401. Of these elements, the PLL 409 is a circuit for generating a rectangular wave of 1 [MHz] having a rise time of 3.7 [nsec] from a sinusoidal wave of 1 [MHz] output from the oscillator 411. The differentiating circuit 408 is a circuit for generating a short pulse by differentiating a rise of the clock signal. The modulator 406 is a circuit for modulating a short pulse, which is a baseband signal, by an intermediate frequency. The UWB multiplier 403 is a circuit for converting a modulated wave of intermediate frequency into a frequency of UWB.

As in the first embodiment, the receiving section detects a rise of an answering wave. Therefore, in contrast with the receiving section of the existing pulse radar, the receiving section is built from a receiving antenna 421, a UWB amplifier 422, a UWB multiplier 423, an IF amplifier 425, an AGC 426, an A/D converter 427 for sampling an intermediate frequency, a comparator 429, and threshold value memory 430. Of these elements, the AGC 426 is a circuit for holding the intensity level of a received signal constant in order to effectively use all bits of the A/D converter. Further, the comparator 429 is a circuit for detecting arrival of the first answering wave.

A filter section 500 is implemented by a neural network capable of performing nonlinear processing. Hence, the filter section 500 is built from an A/D converter 502 for sampling an RF signal; a shift register 503; a multilayer perceptron 504; an adder 507; a weight control section 506; a square device 511; and a shift register 512. Of these elements, the perceptron 505 and the adder 507 generate a pseudo transmission pulse signal. When no target is present, the weight control section 506 performs adaptive processing by changing a weighting coefficient of a neuron in such a way that a sum of squares of feedback signals becomes minimum, through use of a learning algorithm such as an LMS and an RLS disclosed in a publication; for example, "Adaptive Signal Processing" (Sigeo TSUJII, Shokodo Co., Ltd., May 1995), in order to eliminate noise to prevent detection of another signal in a received signal.

The superimposed wave detection section 600 is built from a phase change detector 610, a comparator 611, and threshold value memory 612. The phase change detector 610 is a circuit for extracting a harmonic which arises when an unsmooth waveform appears as a result of arrival or completion of an answering wave.

Figure 18:
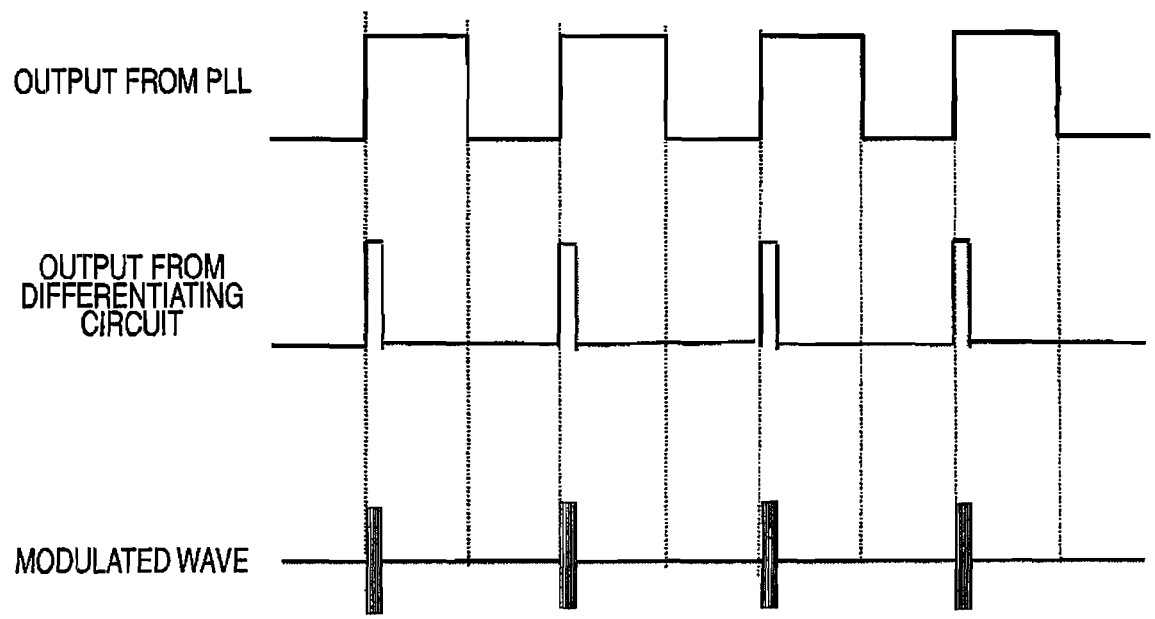
FIG. 18 is a timing chart of operation performed by a transmitting end according to the second embodiment.

As shown in FIG. 18, operation of the transmitting section is substantially analogous to that of the transmitting section in the existing pulse radar. First, the oscillator 411 generates a sinusoidal wave having a period of 1 [MHz]. The sinusoidal wave having a period of 1 [MHz] is converted, by the PLL 409, into a rectangular wave of 1 [MHz] having a rise time of 3.7 [nsec]. When a clock signal converted into the rectangular wave of 1 [MHz] having a rise time of 3.7 [nsec] is input to differentiating circuit 408, the differentiating circuit 408 differentiates the rise of the clock signal, thereby generating, as a transmission pulse, a short pulse having a pulse width of 2.5 [nsec]. The thus-generated transmission pulse is modulated by the modulator 406 through use of a sinusoidal wave of 2 [GHz] which is an intermediate frequency, to thus be converted into a modulated wave of intermediate frequency. The thus-modulated transmission pulse is input to the UWB multiplier 402 after being amplified by the IF amplifier 405. The UWB multiplier 403 converts the input modulated wave of intermediate frequency into a modulated wave of UWB. The modulated wave of the UWB is radiated toward a target from the transmitting antenna 401 after being amplified by the UWB amplifier 402.

Since the receiving section detects a rise of an answering wave, the receiving section performs operation which is considerably different from that performed by its counterpart section in the existing pulse radar. A received signal output from the receiving antenna 421 is amplified by the RF amplifier 422, and the thus-amplified signal is converted from a modulated wave of UWB into a modulated wave of IF frequency of 2 [GHz] by the UWB multiplier 423. The operation of the radar mentioned thus far is the same as the operation of the existing pulse radar. However, the received signal converted into the modulated wave of IF frequency is input to the A/D converter 422, where the signal is subjected to IF sampling, to thus become converted from an analogue signal into a digital signal. At this time, in order to effectively use all of the bits of the A/D converter, the AGC 426 controls a gain of the RF amplifier 425, to thus hold the intensity level of the received signal constantly. The received signal converted into a digital signal is input to the subtractor 428, where the pseudo transmission pulse signal generated by adaptive processing performed in the filter section 500 is subtracted, whereupon a diffracted transmission pulse signal is deleted, to thus extract only an answering wave.

The received signal from which only the answering signal has been extracted is input as a feedback signal to the comparator 429 and the superimposed wave detection section 600. In the learning mode, the signal is input as a feedback signal further to the filter section 500. Upon receipt of an input of an answering wave, the comparator 429 determines whether or not an absolute value of an amplitude surpasses a threshold value 430.

As shown in FIG. 13, when the absolute value exceeds the threshold value at Flag=0, in Flag0 memory 433, which shows that an answering wave has not yet arrived, this time is taken as a time when the first answering wave has arrived, and a trigger signal is input to a delay circuit 434. Concurrently, the trigger signal is also input to the Flag0 memory 433, and Flag0 is changed to 1 (one), thereby explicitly showing that an answering wave is in the middle of arrival. When the value of the Flag0 memory 433 is changed to 1, the superimposed wave detection section 600 is informed that the answering signal is in the middle of arrival. As illustrated, the superimposed wave detection section 600 is delayed by an amount corresponding to the pulse width, and the Flag2, in Flag2 memory 433, is changed to 1, thereby enabling output of an answering wave detection trigger signal.

When an answering wave is input, the comparator 431 determines whether or not an absolute value of the amplitude is smaller than the threshold value. When a phenomenon of the absolute value being smaller than the threshold value has arisen at Flag0=1, in the Flag0 memory 433, which shows that the answering wave is in the middle of arrival, the trigger signal is also input to the Flag0 memory 433 to change Flag0 to 0, thereby explicitly showing that the answering wave has not arrived. When the value of the Flag0 memory 433 is changed to 0 (zero), the superimposed wave detection section 600 is informed of completion of the answering wave. As illustrated, the superimposed wave detection section 600 changes the value of the Flag2 memory 433, i.e. Flag0, to 0, thereby stopping output of the answering wave detection trigger signal.

When the trigger signal is input to the delay circuit 434, the delay circuit 434 delays the signal by an amount corresponding to the pulse width as illustrated in order to adjust timing with detecting a superimposed wave, and a trigger signal for detecting a target is output. Through foregoing operations, a time difference between the rise time of the answering wave from each of the targets and the rise time of the transmission pulse or a time difference between the fall time of the answering wave and the fall time of the transmission pulse can be detected.

First, the filter section 500 inputs the modulated transmission pulse to the A/D converter 502, where the transmission pulse is subjected to IF sampling, to thus become converted from an analogue signal into a digital signal. At this time, the AGC 426 controls a gain of the IF amplifier 501 for feedback purpose, thereby holding the ratio of the received signal to the transmission pulse signal constant in terms of an intensity level. The transmission pulse transformed into a digital signal is input to the shift register 503. The transmission pulse signal input to the shift register 503 is weighted for each sampled value, and the thus-weighted pulses are input to the perceptron element 505. An output from a final layer of the perceptron elements is finally superimposed by the adder 507, whereupon the thus-superimposed signal is transformed into a pseudo transmission pulse signal. Thus, the filter section 500 generates a pseudo transmission pulse signal for erasing the diffracted transmission pulse signal.

In the learning mode, the received signal, from which only the answering wave has been extracted, returns as a feedback signal to the filter section. The thus-returned feedback signal is squared by the square device 511, and the thus-squared signal is stored in the shift register 512. The feedback signal stored in the shift register 512 is superimposed by the adder 513 for each of sampled values, thereby determining the sum of squares. The weight control section 506 changes the weighting coefficient of the neuron 505 such that the sum of squares of the feedback signal becomes minimum. A method of backward propagation of errors disclosed in a publication; for example, "Adaptive Signal Processing" (Sigeo TSUJII, Shokodo Co., Ltd., May 1995), is used as the learning algorithm at this time. Thus, in the learning mode, the weight control section 506 changes a weighting coefficient of the neuron, by the learning algorithm, in such a way that the sum of squares of the feedbacks signals becomes minimum.

The superimposed wave detection section 600 inputs the input answering wave to phase change detector 610, where the amount of phase change in a superimposed wave is detected. A signal output from the phase change detector 610 is input to the comparator 611. The comparator 611 compares the value of the output signal exhibiting the amount of phase change with the threshold value stored in the threshold value memory 612, thereby determining whether or not the absolute value of the signal output from the phase change detector 610 is in excess of the threshold value. At this time, when an answering wave has arrived or ended and when a phase delay has arisen in a carrier wave, the signal output from the phase change detector 610 exceeds the threshold value. When the threshold value is exceeded, the time is taken as a time when the answering wave has arrived or ended. As illustrated, at this time, when Flag0=1 is achieved, Flag2 is changed to 1 in the Flag2 memory 614, and an answering wave detection trigger signal is output. When Flag0=0 is achieved, Flag2 is changed to 0 in the Flag2 memory 614, and an output of the answering wave detection trigger signal is canceled. Thus, the superimposed wave detection section 600 outputs only the phase change induced by completion of the answering wave.

As mentioned above, the transmission pulse is not required to be complete before arrival of the answering wave. Hence, in addition to implementation of a radar having high short-range resolution without shortening a pulse width, an advantage analogous to that in the first embodiment is achieved. According to the present embodiment, the occupied band width required for a landing assist radar can be made narrower than a value determined by the expression of "light speed divided by the minimum measurable distance." Therefore, a band of a UWB radar of the present embodiment can be assigned at a vacant band between frequency bands assigned to other systems, such as a WiMAX, thereby avoiding occurrence of radio interference.

What is claimed is:

1. A pulse radar in which a distance is computed from a time difference between when a transmission signal is transmitted to a target and when the transmission signal reflected on the target is received as an answering signal, the pulse radar comprising:

a transmitting antenna for transmitting the transmission signal;

a receiving antenna for receiving a signal from the target;

a filter which is capable of filtering the answering signal embedded in the received signal in which a diffracted transmission signal from the transmitting antenna to the receiving antenna is superimposed on the answering signal from the target; and a detector which is capable of extracting a harmonic which is a signal having higher frequency than that of a carrier wave to detect the time difference between a rise time of the answering signal and the rise time of the transmission signal and the time difference between the fall time of the answering signal and the fall time of the transmission signal.

2. A pulse radar according to claim 1, wherein:
the pulse radar is capable of measuring a distance to the target located at a position which is one-half or less of a distance over which an electromagnetic wave propagates within a duration time of the transmission signal.

3. The pulse radar according to claim 1, wherein:
an occupied bandwidth by the pulse radar is narrower than a value obtained by dividing light speed by a minimum measurable distance.

4. A vehicle-mounted radar comprising:
the pulse radar according to claim 1, wherein:
a wavelength of a carrier wave is a same degree in size as a width of a vehicle.

5. A vehicle-mounted radar comprising:
the pulse radar according to claim 1; and
a sharing device which shares a receiving processing circuit with a keyless entry system by making a frequency of a carrier wave equal to a frequency of the keyless entry system.

6. A landing assist radar comprising:
the pulse radar according to claim 1; and
a measuring device which measures a low altitude at which a time elapsing from transmitting the transmission signal until an electromagnetic wave reflected on a ground or a sea surface is received becomes shorter than a duration time of the transmission signal.

7. A landing assist radar according to claim 6, wherein:
a wavelength of a carrier wave is a same degree in size as a width of an air frame of an aircraft.

8. A landing assist radar according to claim 6, wherein:
a wavelength of a carrier wave is longer than a horizontal distance over which an aircraft moves within a period of time from transmitting a transmission signal until an electromagnetic wave reflected on the ground or the sea surface is received.

\* \* \* \* \*